N. B. COOKSEY.
Gate.
No. 198,838. Patented Jan. 1, 1878.
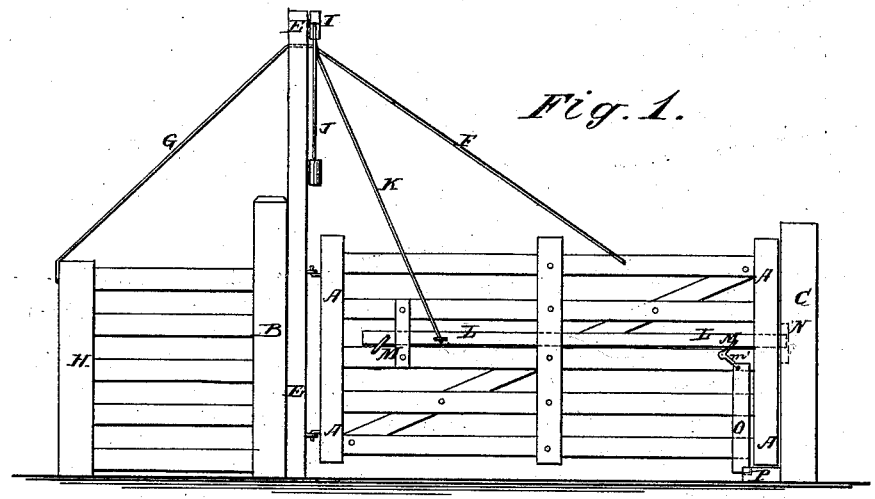
Fig. 1.
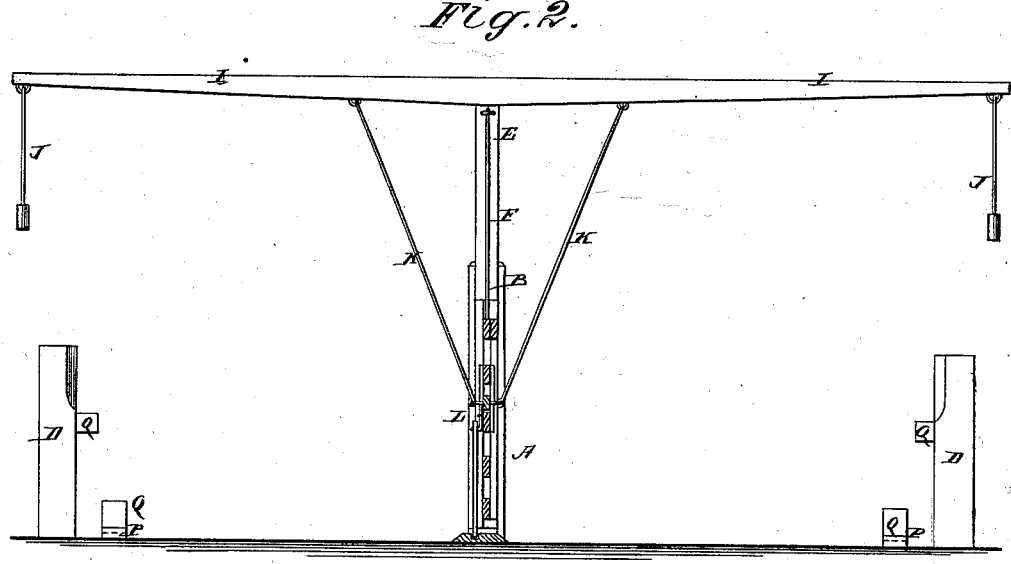
Fig. 2.
Fig. 3. Fig. 4.
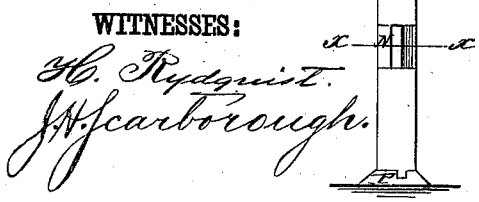
WITNESSES:
H. Rydquist.
J. H. Scarborough.
INVENTOR:
N. B. Cooksey.
BY Munn & Co.
ATTORNEYS.

UNITED STATES PATENT OFFICE.

NICIAS B. COOKSEY, OF CLAY CITY, ILLINOIS.

IMPROVEMENT IN GATES.

Specification forming part of Letters Patent No. 198,838, dated January 1, 1878; application filed October 26, 1877.

*To all whom it may concern:*

Be it known that I, NICIAS BALLARD COOKSEY, of Clay City, in the county of Clay and State of Illinois, have invented a new and useful Improvement in Gates, of which the following is a specification:

Figure 1 is a side view of my improved gate. Fig. 2 is a vertical cross-section of the same. Fig. 3 is a detail front view of the latch-post. Fig. 4 is a cross-section of the same, taken through the line *x x* of Fig. 3.

Similar letters of reference indicate corresponding parts.

The object of this invention is to furnish an improved gate which shall be simple in construction, strong, durable, easily operated by a person on foot or horseback, or in a vehicle, and which shall not be liable to sag or to frighten a team.

The invention consists in the combination of the supporting-rods with the gate, the upright or post, and the rear post; in the combination of the upright or post, the pivoted lever, the suspended rods, and the draw-rods with the gate and the horizontal latch; in the combination of the loops or straps with the horizontal latch and the gate.

A represents the gate, which may be of any desired construction. B is the hinge-post. C is the front-latch post, and D are the side-latch posts.

The gate is hinged to the post B, or to a tall upright or post, E, attached to the forward side of the said post B.

The gate A is supported and kept from sagging by the rods F G. The forward end of the rod F is attached to the forward part of the top of the gate A, and its rear end is pivoted or hinged to the upper part of the upright E, so that it will not interfere with the swinging of the gate upon its hinges.

The forward end of the rod G is attached to the upper part of the upright E, and its rear end is attached to a post, H, of a fence in the rear of the gate, or set in the ground, expressly to receive the said rod.

To the upper end of the upright E is pivoted the center of a lever, I, from the ends of which are suspended rods J, hanging down into such a position that a person upon horseback or in a vehicle can readily reach and operate them to open and close the gate.

The lever I is made of such a length that a person in a vehicle can reach the rods J and operate the lever I, to open the gate, before the team can come in contact with the said gate, and to close the gate after the vehicle has passed so far through the gateway as to be out of the way of the gate as it swings shut.

To the lever I, upon the opposite sides of and equally distant from its pivot, are pivoted the upper ends of two rods, K, which project downward and forward; and their lower ends are pivoted to the opposite sides of the rear part of the latch L.

The latch L is placed in the space between two of the longitudinal bars of the gate A, and is kept in place by the cross-bars and braces of said gate, and by strips attached to said longitudinal bars.

The latch L is connected with the longitudinal bar of the gate, beneath it, by loops or straps M, one of the arms of which is pivoted to the said longitudinal bar, and its other arm is pivoted to the said latch L.

The latch L may be made of such a length as to engage with a catch, N, formed upon or attached to the front post C, to fasten the gate shut, and formed upon or attached to the side posts D, to fasten the gate open.

To the forward loop or strap M is rigidly attached, or upon it is formed, an arm, $m'$, the end of which is pivoted to the upper end of the vertical latch O. The latch O moves up and down through keepers attached to the gate A, and its lower end engages with a catch, P, attached to or formed upon the upper end of a short post set in the ground.

Either or both the latches L O may be used to fasten the gate, as may be desired.

The side catches N P are provided with stops Q to prevent the gate A from swinging past them.

Having thus described my invention, I claim as new and desire to secure by Letters Patent—

1. The combination of the supporting-rods F G with the gate A, the upright or post E, and the post H, substantially as herein shown and described.

2. The combination of the upright or post E, the pivoted lever I, and the rods J and K with the gate A and the latch L, substantially as herein shown and described.

NICIAS B. COOKSEY.

Witnesses:
A. B. WILLETT,
G. W. GWIN.